C. N. WESTWOOD.
COURSE FINDER.
APPLICATION FILED JUNE 23, 1919.
1,350,581.
Patented Aug. 24, 1920.
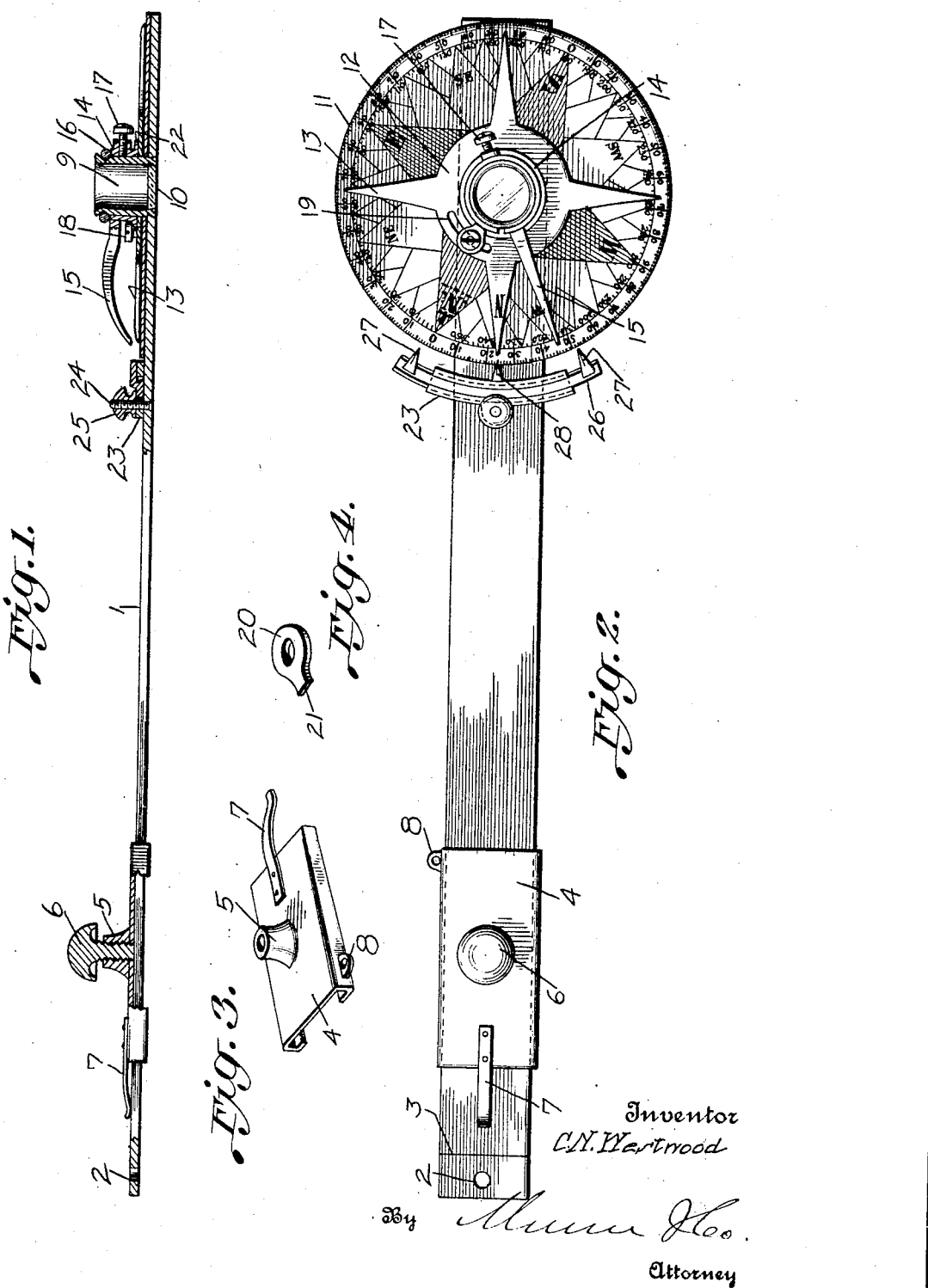
Inventor
C.N. Westwood
By Munn & Co.
Attorney

UNITED STATES PATENT OFFICE.

CORAL NOVELLO WESTWOOD, OF VICTORIA, BRITISH COLUMBIA, CANADA.

COURSE-FINDER.

1,350,581.      Specification of Letters Patent.     Patented Aug. 24, 1920.

Application filed June 23, 1919. Serial No. 306,140.

*To all whom it may concern:*

Be it known that I, CORAL NOVELLO WESTWOOD, a subject of the King of Great Britain, and a resident of Victoria, British Columbia, Canada, have invented a new and useful Improvement in Course-Finders, of which the following is a specification.

My invention is an improvement in course finders and has for its object to provide an instrument of the character specified by means of which in connection with a chart courses may be easily found and corrected.

In the drawings:—

Figure 1 is a side view of the improved instrument with parts in section,

Fig. 2 is a top plan view,

Fig. 3 is a perspective view of the slide, and

Fig. 4 is a similar view of the elongated washer.

In the present embodiment of the invention a blade 1 is provided of suitable material and dimensions, and at one end of this blade is an opening 2 for permitting the instrument to be suspended and a gage mark 3 is drawn squarely across the blade a slight distance from the opening. A slide 4 is mounted upon the blade, the said slide having underlying flanges engaging beneath the blade as shown in Fig. 3, and this slide has a central boss 5 which is internally threaded for engagement by a set screw 6 to hold the slide in adjusted position. When the slide 4 is used in conjunction with the gage line 3 in measuring distances, the set screw engages the blade. A plate spring 7 is secured to the slide at that end adjacent to the opening 2 and the said spring extends beyond the slide into contact with the blade, the arrangement being such that when the slide is moved far enough toward the end of the plate spring 7 will engage within the opening 2 to prevent the slide moving entirely off the blade. At the opposite end from the spring and at one side there is provided a perforated lug 8 extending laterally from the slide, the said lug being adapted to permit the point of a pencil to be passed through the hole onto the chart for pivoting and holding, by means of the slide, the edge of the blade over any particular point while the instrument is set and placed, on any desired course or angle when tracing or laying off a course on a chart, and the lines drawn along the edge of the blade from such point.

Near the opposite end a hollow hub 9 is held within an opening in the blade, and within the hub at the level of the blade is arranged a transparent plate 10, the said plate being of glass or other transparent material and this plate has at its center a fixed dot or mark to indicate the center for centering the instrument over any point. A mariner's compass card 11 is mounted to rotate on the hub adjacent to the blade and above this card is arranged a ring 12 having four arms 13, the said arms being pointed as shown, and constituting with the ring a four-pointed star and the points of the star are arranged at angles of 90° with respect to each other and one of the arms bears the letter N formed upon the upper surface thereof in any suitable or desired manner. Above the ring 12 a collar 14 encircles the hub and this collar has a single pointer 15 extending to the outermost scale of the compass card as do also the arms 13. These elements, namely, the card, the ring and the collar, are held in place on the hub by means of a split resilient ring 16 clamped about the hub above the collar, and it will be noticed that the upper end of the hub has an angular groove cut into it, into which the ring is sprung and, contracting in the groove, holds all the revolving parts frictionally tight on the hub by pressing down of collar 14. The collar may be clamped on the hub by means of a set screw 17 which is threaded through a boss on the collar in engagement with the hub.

The four-pointed star may be clamped to the compass card by means of a set screw 18 which passes through an arc shaped slot 19 in the ring 12 into engagement with the card. A washer 20 encircles this set screw above the ring 12 and this washer has a radial lug 21 which overlies an outwardly extending flange 22 at the lower end of the collar. Hence when the washer 20 is placed in proper position and the set screw 18 is turned in the proper direction the compass card and the four-pointed star will not only be clamped together but the collar will also be clamped to the star. An arc shaped guide 23 is rigidly fastened to the blade and by means of a threaded stem 24 and a thumb nut 25, the threaded stem being rigid with the blade and passing through an opening in a lug at the center of the convex edge of the guide and being engaged by the thumb nut above the guide, and by means of the thumb nut the slide 26 may be clamped to the blade. This guide has overlying flanges at its upper surface and beneath these flanges is slidably mounted the arc shaped bar or slide 26, the said bar being of a length to extend well beyond the guide at each end and having at each of the extended ends a pointer or indicator 27. The guide has at its center a pointer or indicator 28 and the pointers 27 are offset upwardly so that they will pass the flanges of the guide and will also pass this indicator 28 which is rigidly fastened to the center of the blade.

The mariner's compass card is graduated from naught to ninety, from north and south to east and west, also from zero at the north point to the right or to the east to 359° in consecutive order, indicating figures being placed at, say, every 10°. The card is otherwise the ordinary and usual mariner's compass card.

In the use of the elements shown at the left of Figs. 1 and 2, the slide 4 may be clamped at any desired point on the blade when the slide is used together with the gage line 3 in measuring distances.

In operation, assuming that a chart has a variation of 25° east and that the points 13 of the instrument are coincident with the four cardinal points of the compass card. The instrument is placed with the blade away from the user, the card is then rotated until the N coincides with the point or indicator 28 of the blade, this point being at the center of the blade. The clamping screw 18 is now loosened and the four-pointed star is rotated to the west of the compass card until that point of the four pointed star bearing the mark N is 25° west of the N on the compass card, after which the clamping screw 18 is tightened to clamp the parts together. (In allowing for east variation the point N on the four-pointed star is always set to the west and always to the east for west variation.) Now place the blade of the instrument on the chart in the direction of the course required, hold the slide 4 firmly on the chart while the compass is moved onto the most convenient line of parallel or meridian, by placing the dot, at the center of the plate 10, immediately on such line, then the compass is rotated, always keeping the north of the compass to the northerly portion of the chart until two opposite points of the four-pointed star come into parallelism with the line over which the dot in the plate 10 has been placed. The course is now read on the compass at the point 28, this being the correct magnetic course to steer by a compass having no deviation, and for use in the following example we will assume that the course is N. 29° W.

Suppose a compass has a deviation of 6° east and it is desired to steer by it an equal course to the one above, that is, N. 29° W. (The variations are not needed in this operation but may remain set up on the instrument.) By placing the point 27 on the slide 26 which is at the top of Fig. 2, 6° east of the point 28 and then bringing the course N. 29° W. to this point 27 there will be read N. 35° W., the course required. If the deviation had been 6° west then the point 27 at the bottom of the slide 26 would have been moved 6° west and the course N. 29° W. moved to this point 27 and the course required, N. 23° W., would be read at the point 28 as before.

By reversing the operation the courses are corrected to magnetic. Take, for instance, the course last mentioned, N. 23° W., having a deviation of 6° west, which, reversed, would be 6° east, the point 27 at the top of the slide 26 would be placed 6° east of the point 28, and the course N. 23° W. would be brought to it and then read the magnetic course of N. 29° W., the assumed course obtained by the first example with a variation of 25° east.

All courses by deviating compasses should be corrected to magnetic if to be traced on a chart under proper variation of place by the instrument, by aid of the lug 8.

The pointer 15 when used in conjunction with the point 28 to find the true courses from the magnetic ones is placed at the exact number of degrees of variation but in the opposite direction, that is, for west variation the pointer is set to the east, and for east variation the pointer is set to the west. When the pointer 15 is used as an indicator of the direction of tides, currents or wind, relative to the course being steered, it is released from the hub 9 and is clamped to the four-pointed star 12 by placing the lug of the washer 20 over the flange of the collar 14. The pointer is then set to the direction from which the wind is coming and on the compass card the angle between the pointer and the course can be read off from time to time as the course may be changed should the wind continue from the same direction and leeward allowed accordingly.

I claim:—

1. A device of the character specified, comprising a blade, a hub near one end of the blade, a mariner's compass card mounted to rotate on the hub, a ring having pointers extending at angles of ninety degrees mounted on the hub above the card, a pointer journaled on the hub above the ring to rotate thereon, means for clamping the pointer to the hub, means for clamping the ring to the card and having means for clamping the pointer to the ring when desired, a fixed indicator on the blade, and a pair of indicators spaced apart from each other and arranged on opposite sides of the first-named indicator and simultaneously adjustable with respect thereto.

2. A device of the character specified, comprising a blade, a hub near one end of the blade, a mariner's compass card mounted to rotate on the hub, a ring having pointers extending at angles of ninety degrees mounted on the hub above the card and coöperating therewith, a pointer journaled on the hub above the ring to rotate thereon, means for clamping the pointer to the hub, means for clamping the ring to the card, and having means for clamping the pointer to the ring when desired, a fixed indicator on the blade, and a pair of indicators fixed with respect to each other and adjustable simultaneously with respect to the first named indicator laterally of the blade.

3. A device of the character specified, comprising a blade, a hub near one end of the blade, a mariner's compass card mounted to rotate on the hub, a ring having pointers extending at angles of ninety degrees mounted on the hub above the card and coöperating therewith, means for clamping the ring to the card, a fixed indicator on the blade, and a pair of indicators fixed with respect to each other and adjustable simultaneously with respect to the first named indicator laterally of the blade.

4. A device of the character specified comprising a blade, a mariner's compass card mounted to rotate on the blade, a fixed indicator on the blade coöperating with the compass card, an arc shaped bar adjustable transversely of the blade and carrying indicators at its ends coöperating with the card, a ring having points arranged at angles of ninety degrees with respect to each other rotatable on the blade at the axis of the card, means for fixing the ring and the compass with respect to the blade, a pointer mounted to swing about the axis of the card, and means in connection with the fixing means of the card and ring for fixing also the pointer.

5. A device of the character specified comprising a blade, a mariner's compass card mounted to rotate on the blade, a fixed indicator on the blade coöperating with the compass card, an arc shaped bar adjustable transversely of the blade and carrying indicators at its ends coöperating with the card, a ring having points arranged at angles of ninety degrees with respect to each other rotatable on the blade at the axis of the card, and means for fixing the ring and the compass with respect to the blade.

6. A device of the character specified comprising a blade, a mariner's compass card mounted to rotate on the blade, a fixed indicator on the blade coöperating with the compass card, and an arc shaped bar adjustable transversely of the blade and carrying indicators at its ends coöperating with the card.

7. A device of the character specified, a blade, a slide mounted to move longitudinally of the blade, means for fixing the slide, and means for preventing accidental displacement of the slide from the blade, said means comprising an opening in the blade and a spring on the slide and adapted to engage the opening when the slide is near the end of the blade.

8. In an instrument of the character specified, a blade having at one end a hub and indicating mechanism mounted to rotate on the hub, said mechanism including a sleeve encircling the hub, the hub having an annular groove near its upper end and a split ring in the groove and engaging the upper end of the sleeve, said groove and ring having coöperating cam surfaces for forcing the ring downwardly.

9. A device of the character specified comprising a blade, a mariner's compass card mounted to rotate on the blade, a fixed indicator on the blade coöperating with the compass card, and a bar adjustable transversely of the blade and carrying indicators at its ends coöperating with the card.

CORAL NOVELLO WESTWOOD.